000

(12) United States Patent
Lee et al.

(10) Patent No.: US 11,476,979 B2
(45) Date of Patent: Oct. 18, 2022

(54) METHOD FOR HANDLING AN ADAPTIVE RETRANSMISSION IN A WIRELESS COMMUNICATION SYSTEM AND DEVICE THEREFOR

(71) Applicant: LG ELECTRONICS INC., Seoul (KR)

(72) Inventors: Sunyoung Lee, Seoul (KR); Seungjune Yi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 356 days.

(21) Appl. No.: 15/761,775

(22) PCT Filed: Sep. 21, 2016

(86) PCT No.: PCT/KR2016/010499
§ 371 (c)(1),
(2) Date: Mar. 20, 2018

(87) PCT Pub. No.: WO2017/052170
PCT Pub. Date: Mar. 30, 2017

(65) Prior Publication Data
US 2020/0244406 A1    Jul. 30, 2020

Related U.S. Application Data

(60) Provisional application No. 62/221,609, filed on Sep. 21, 2015.

(51) Int. Cl.
*H04L 1/18* (2006.01)
*H04L 1/08* (2006.01)
(Continued)

(52) U.S. Cl.
CPC ............. *H04L 1/1816* (2013.01); *H04L 1/08* (2013.01); *H04L 1/1835* (2013.01);
(Continued)

(58) Field of Classification Search
CPC ... H04L 1/1816; H04L 1/1819; H04L 1/1825; H04L 1/1835; H04L 1/08; H04W 72/14;
(Continued)

(56) References Cited

U.S. PATENT DOCUMENTS 8,995,462 B2 * 3/2015 Kim ................. H04W 74/08
                                                                370/445
2010/0027460 A1 * 2/2010 Kim ................... H04L 1/1874
                                                                370/315
(Continued)

OTHER PUBLICATIONS

PCT International Application No. PCT/KR2016/010499, International Search Report dated Jan. 23, 2017, 8 pages.
(Continued)

*Primary Examiner* — Ian N Moore
*Assistant Examiner* — Sun Jong Kim
(74) *Attorney, Agent, or Firm* — Lee Hong Degerman Kang & Waimey

(57) ABSTRACT

A method and a device for handling an adaptive retransmission in a wireless communication system. The method includes receiving a RRC signaling configuring that the UE skips an UL transmission if there is no data available for transmission, receiving an UL grant for retransmission for a HARQ process when a HARQ buffer of the HARQ process is empty, and discarding the UL grant for the retransmission even if there is data available for transmission.

9 Claims, 7 Drawing Sheets

(51) Int. Cl.
*H04W 72/04* (2009.01)
*H04W 72/14* (2009.01)
*H04L 5/00* (2006.01)

(52) U.S. Cl.
CPC ......... *H04W 72/042* (2013.01); *H04W 72/14* (2013.01); *H04L 5/0007* (2013.01)

(58) Field of Classification Search
CPC ............... H04W 8/24; H04W 72/1268; H04W 72/1278; H04W 72/1284; H04W 72/1294
See application file for complete search history.

(56) References Cited

U.S. PATENT DOCUMENTS

| | | | |
|---|---|---|---|
| 2010/0070816 A1 | 3/2010 | Park et al. | |
| 2010/0177649 A1* | 7/2010 | Ishii | H04L 1/1812 370/252 |
| 2011/0310833 A1 | 12/2011 | Lee et al. | |
| 2012/0184314 A1* | 7/2012 | Malladi | H04L 1/0038 455/509 |
| 2013/0195060 A1 | 8/2013 | Park et al. | |
| 2013/0229931 A1* | 9/2013 | Kim | H04W 76/11 370/252 |
| 2013/0242893 A1* | 9/2013 | Ishii | H04W 72/1289 370/329 |
| 2014/0092829 A1* | 4/2014 | Han | H04L 5/0053 370/329 |
| 2014/0254509 A1* | 9/2014 | Chen | H04L 5/0058 370/329 |
| 2014/0362832 A1* | 12/2014 | Rudolf | H04W 72/0413 370/336 |
| 2016/0029239 A1* | 1/2016 | Sadeghi | H04W 24/10 370/252 |
| 2016/0205704 A1* | 7/2016 | Aiba | H04W 72/14 370/329 |
| 2017/0034808 A1* | 2/2017 | Ouchi | H04W 52/226 |
| 2017/0208607 A1* | 7/2017 | Quan | H04L 1/1861 |

OTHER PUBLICATIONS

Intel, "Protocol impact of fast uplink access solution for latency reduction", 3GPP TSG RAN WG2 Meeting #91, R2-153294, Aug. 2015, 3 pages.

Samsung, "Skipping uplink transmission with no data to transmit", 3GPP TSG RAN WG2 Meeting #91, R2-153332, Aug. 2015, 2 pages.

* cited by examiner

[Fig. 1]
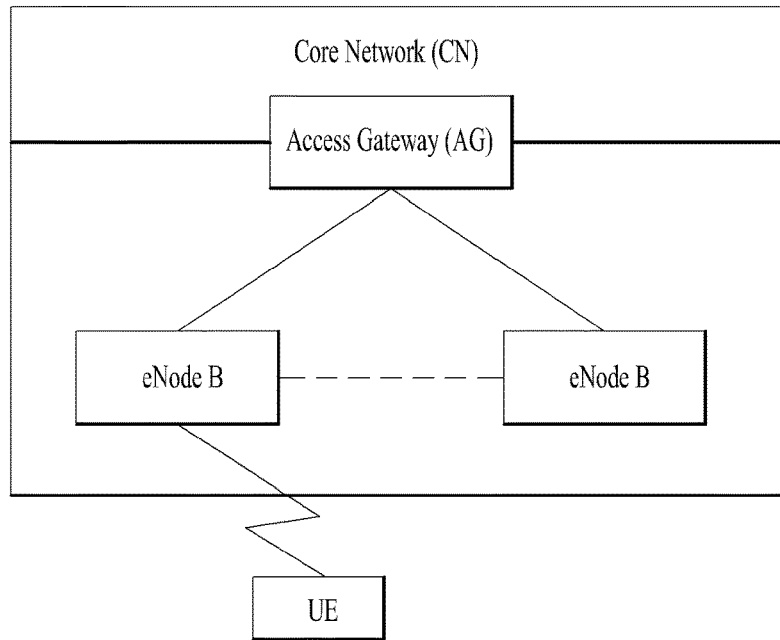
[Fig. 2A]
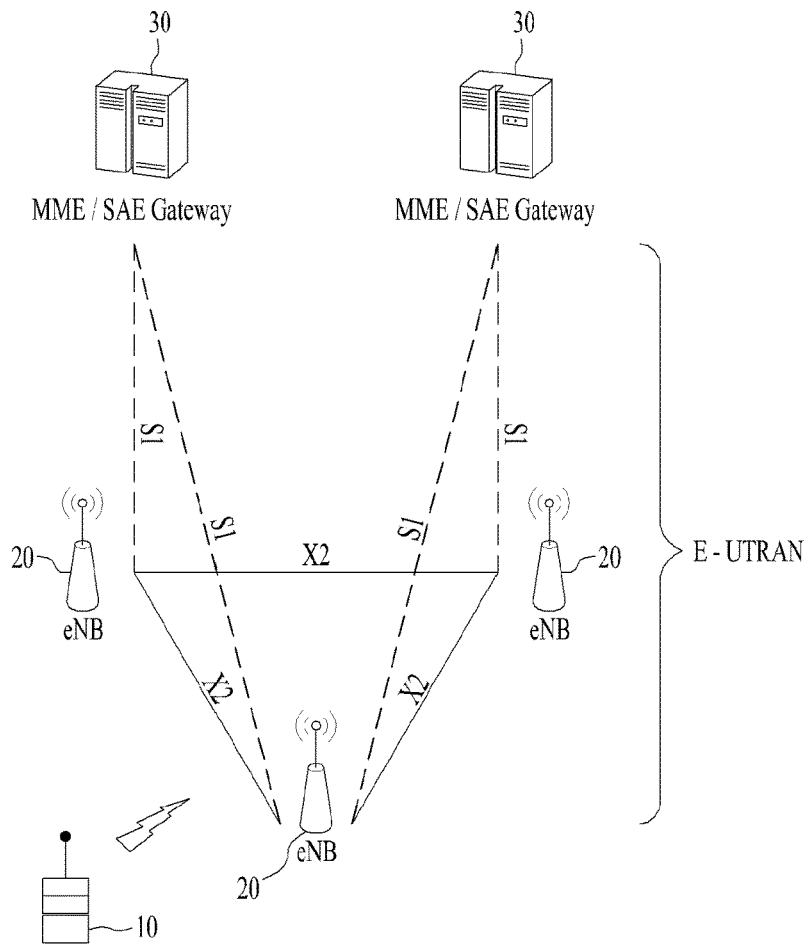

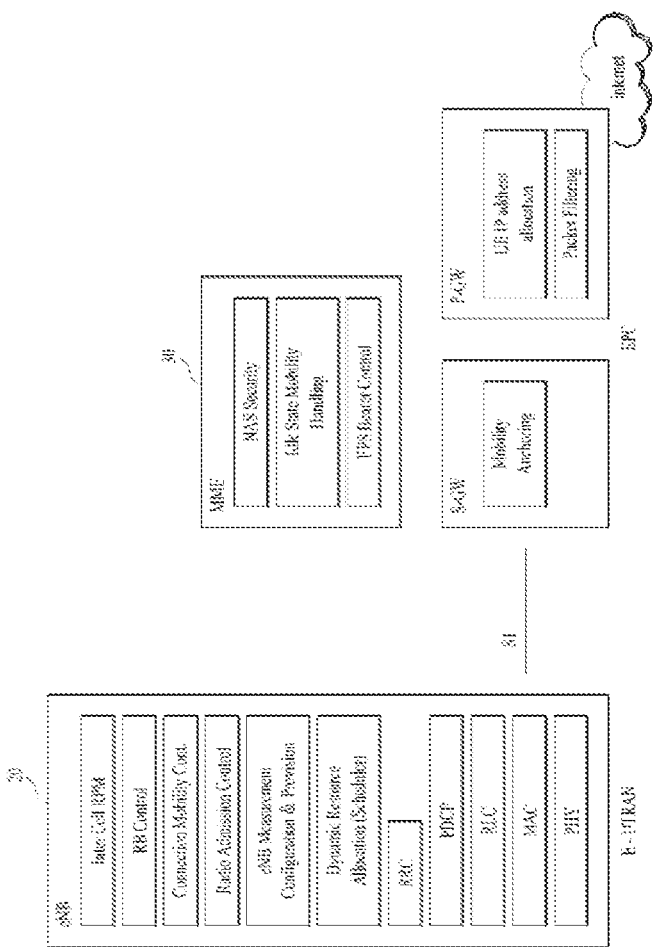
[Fig. 2B]

[Fig. 3]
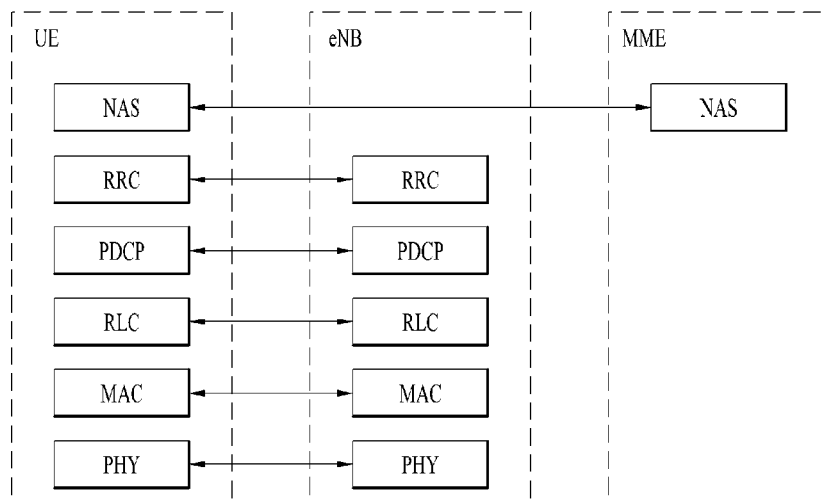
(a) Control-Plane Protocol Stack
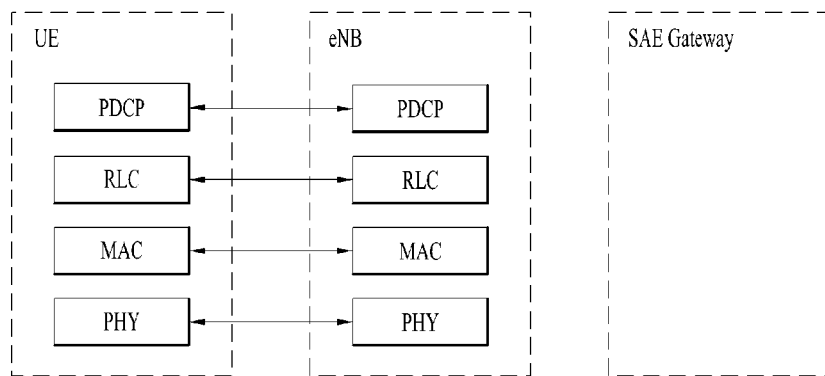
(b) User-Plane Protocol Stack
[Fig. 4]
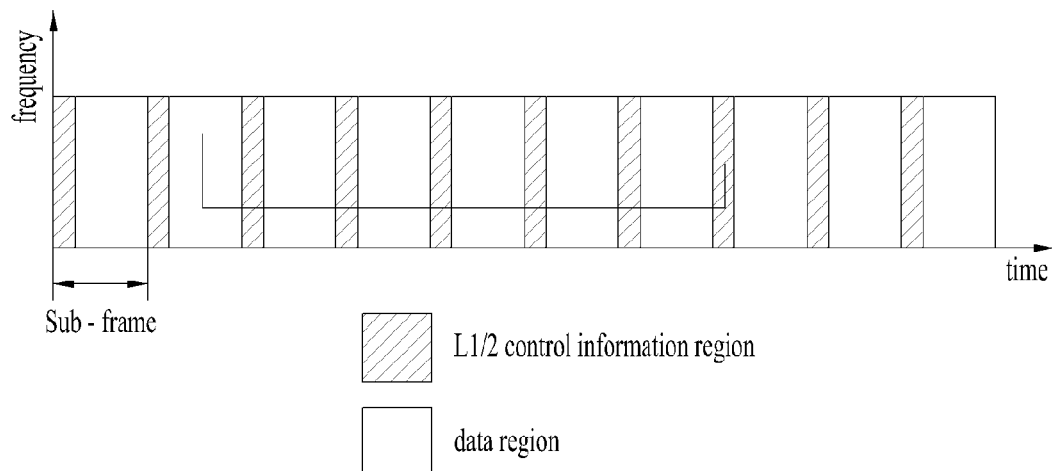

[Fig. 5]
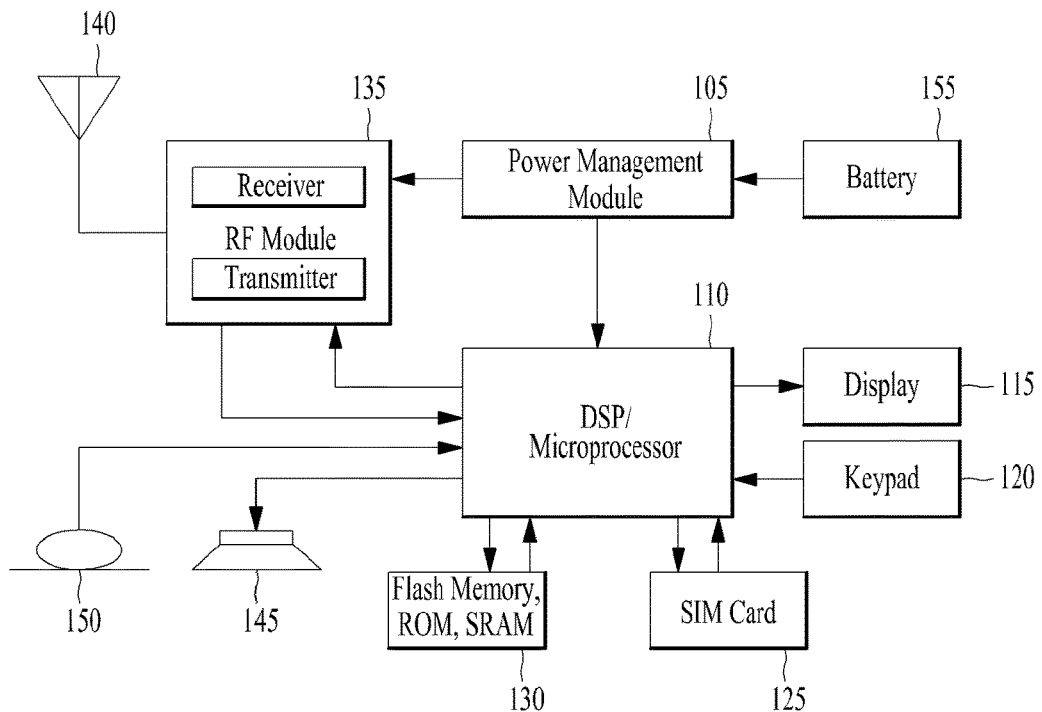
[Fig. 6]
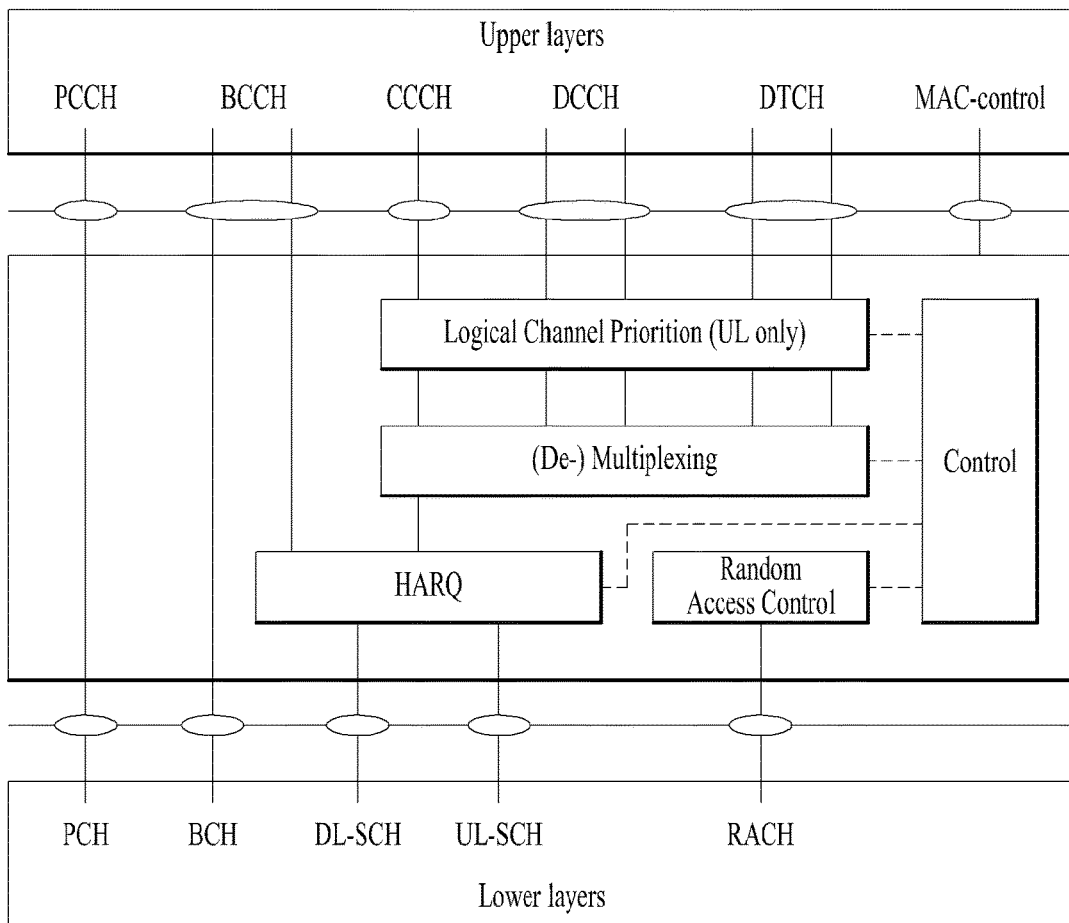

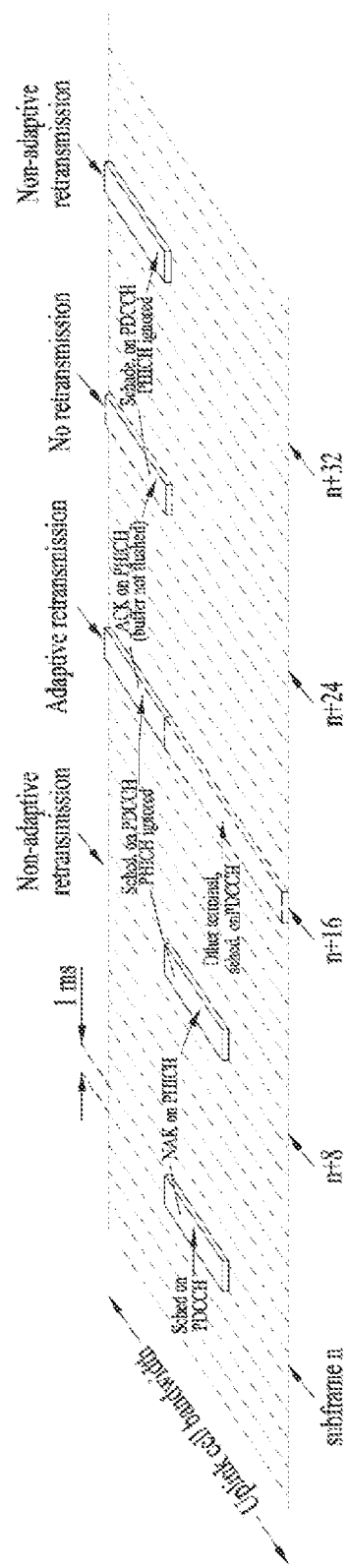
[Fig. 7]

[Fig. 8A]
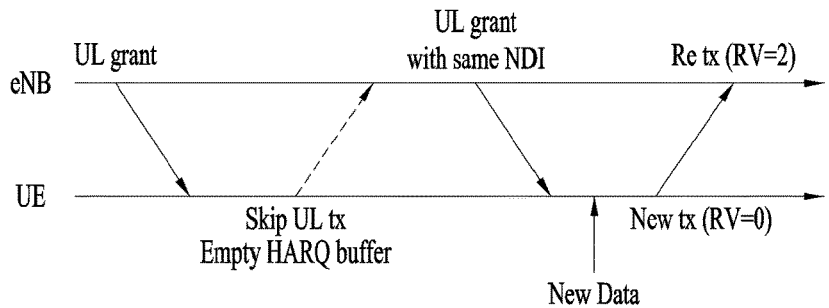
[Fig. 8B]
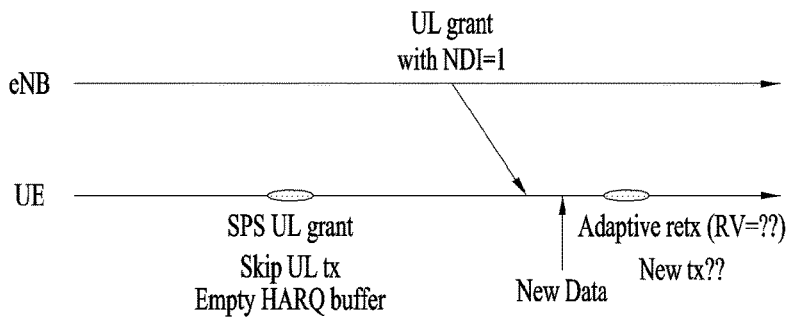
[Fig. 9]
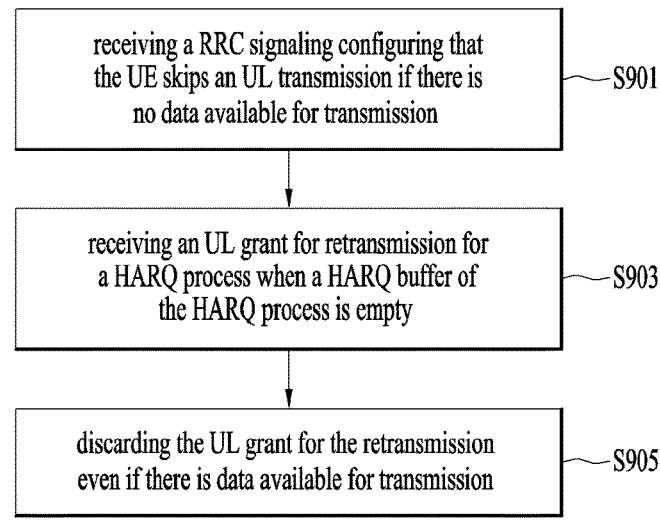
[Fig. 10A]
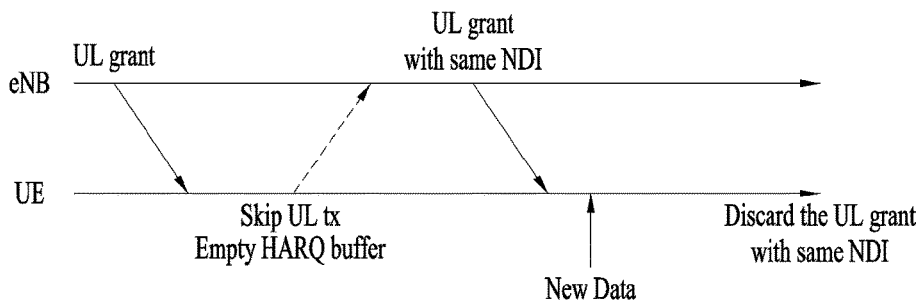

[Fig. 10B]
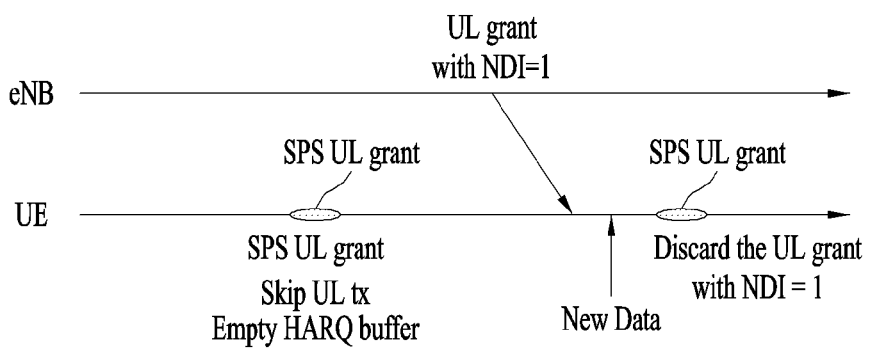

METHOD FOR HANDLING AN ADAPTIVE RETRANSMISSION IN A WIRELESS COMMUNICATION SYSTEM AND DEVICE THEREFOR

CROSS-REFERENCE TO RELATED APPLICATIONS

This application is the National Stage filing under 35 U.S.C. 371 of International Application No. PCT/KR2016/010499, filed on Sep. 21, 2016, which claims the benefit of U.S. Provisional Application No. 62/221,609, filed on Sep. 21, 2015, the contents of which are all hereby incorporated by reference herein in its entirety.

TECHNICAL FIELD

The present invention relates to a wireless communication system and, more particularly, to a method for handling an adaptive retransmission in a wireless communication system and a device therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells may exist per eNB. The cell is set to operate in one of bandwidths such as 1.25, 2.5, 5, 10, 15, and 20 MHz and provides a downlink (DL) or uplink (UL) transmission service to a plurality of UEs in the bandwidth. Different cells may be set to provide different bandwidths. The eNB controls data transmission or reception to and from a plurality of UEs. The eNB transmits DL scheduling information of DL data to a corresponding UE so as to inform the UE of a time/frequency domain in which the DL data is supposed to be transmitted, coding, a data size, and hybrid automatic repeat and request (HARQ)-related information. In addition, the eNB transmits UL scheduling information of UL data to a corresponding UE so as to inform the UE of a time/frequency domain which may be used by the UE, coding, a data size, and HARQ-related information. An interface for transmitting user traffic or control traffic may be used between eNBs. A core network (CN) may include the AG and a network node or the like for user registration of UEs. The AG manages the mobility of a UE on a tracking area (TA) basis. One TA includes a plurality of cells.

Although wireless communication technology has been developed to LTE based on wideband code division multiple access (WCDMA), the demands and expectations of users and service providers are on the rise. In addition, considering other radio access technologies under development, new technological evolution is required to secure high competitiveness in the future. Decrease in cost per bit, increase in service availability, flexible use of frequency bands, a simplified structure, an open interface, appropriate power consumption of UEs, and the like are required.

DISCLOSURE OF INVENTION

Technical Problem

An object of the present invention devised to solve the problem lies in a method and device for a method for handling an adaptive retransmission in a wireless communication system. The technical problems solved by the present invention are not limited to the above technical problems and those skilled in the art may understand other technical problems from the following description.

Solution to Problem

The object of the present invention can be achieved by providing a method for User Equipment (UE) operating in a wireless communication system as set forth in the appended claims.

In another aspect of the present invention, provided herein is a communication apparatus as set forth in the appended claims.

It is to be understood that both the foregoing general description and the following detailed description of the present invention are exemplary and explanatory and are intended to provide further explanation of the invention as claimed.

Advantageous Effects of Invention

It is invented that if a UE receives an UL grant for adaptive retransmission while the UE is configured to skip UL transmission in case there is no data available for transmission, the UE discards (or ignores) the received UL grant for adaptive retransmission and does not perform UL transmission, even if there is data available for transmission. According to the present invention, adaptive retransmission can work well in case that the UE skips an UL transmission.

It will be appreciated by persons skilled in the art that the effects achieved by the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention.

FIG. 1 is a diagram showing a network structure of an Evolved Universal Mobile Telecommunications System (E-UMTS) as an example of a wireless communication system;

FIG. 2A is a block diagram illustrating network structure of an evolved universal mobile telecommunication system (E-UMTS), and FIG. 2B is a block diagram depicting architecture of a typical E-UTRAN and a typical EPC;

FIG. 3 is a diagram showing a control plane and a user plane of a radio interface protocol between a UE and an E-UTRAN based on a 3rd generation partnership project (3GPP) radio access network standard;

FIG. 4 is a view showing an example of a physical channel structure used in an E-UMTS system;

FIG. 5 is a block diagram of a communication apparatus according to an embodiment of the present invention;

FIG. 6 is a diagram for MAC structure overview in a UE side;

FIG. 7 shows an example of Non-adaptive and adaptive HARQ operation;

FIGS. 8A and 8B show exemplary problems in case that a UE skips UL transmission;

FIG. 9 is a diagram for handling an adaptive retransmission in a wireless communication system according to embodiments of the present invention; and FIGS. 10A and 10B show examples of UE operation for handling an adaptive retransmission according to embodiments of the present invention.

BEST MODE FOR CARRYING OUT THE INVENTION

Universal mobile telecommunications system (UMTS) is a 3rd Generation (3G) asynchronous mobile communication system operating in wideband code division multiple access (WCDMA) based on European systems, global system for mobile communications (GSM) and general packet radio services (GPRS). The long-term evolution (LTE) of UMTS is under discussion by the 3rd generation partnership project (3GPP) that standardized UMTS.

The 3GPP LTE is a technology for enabling high-speed packet communications. Many schemes have been proposed for the LTE objective including those that aim to reduce user and provider costs, improve service quality, and expand and improve coverage and system capacity. The 3G LTE requires reduced cost per bit, increased service availability, flexible use of a frequency band, a simple structure, an open interface, and adequate power consumption of a terminal as an upper-level requirement.

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention are described using a long term evolution (LTE) system and a LTE-advanced (LTE-A) system in the present specification, they are purely exemplary. Therefore, the embodiments of the present invention are applicable to any other communication system corresponding to the above definition. In addition, although the embodiments of the present invention are described based on a frequency division duplex (FDD) scheme in the present specification, the embodiments of the present invention may be easily modified and applied to a half-duplex FDD (H-FDD) scheme or a time division duplex (TDD) scheme.

FIG. 2A is a block diagram illustrating network structure of an evolved universal mobile telecommunication system (E-UMTS). The E-UMTS may be also referred to as an LTE system. The communication network is widely deployed to provide a variety of communication services such as voice (VoIP) through IMS and packet data.

As illustrated in FIG. 2A, the E-UMTS network includes an evolved UMTS terrestrial radio access network (E-UTRAN), an Evolved Packet Core (EPC) and one or more user equipment. The E-UTRAN may include one or more evolved NodeB (eNodeB) 20, and a plurality of user equipment (UE) 10 may be located in one cell. One or more E-UTRAN mobility management entity (MME)/system architecture evolution (SAE) gateways 30 may be positioned at the end of the network and connected to an external network.

As used herein, "downlink" refers to communication from eNodeB 20 to UE 10, and "uplink" refers to communication from the UE to an eNodeB. UE 10 refers to communication equipment carried by a user and may be also referred to as a mobile station (MS), a user terminal (UT), a subscriber station (SS) or a wireless device.

FIG. 2B is a block diagram depicting architecture of a typical E-UTRAN and a typical EPC.

As illustrated in FIG. 2B, an eNodeB 20 provides end points of a user plane and a control plane to the UE 10. MME/SAE gateway 30 provides an end point of a session and mobility management function for UE 10. The eNodeB and MME/SAE gateway may be connected via an S1 interface.

The eNodeB 20 is generally a fixed station that communicates with a UE 10, and may also be referred to as a base station (BS) or an access point. One eNodeB 20 may be deployed per cell. An interface for transmitting user traffic or control traffic may be used between eNodeBs 20.

The MME provides various functions including NAS signaling to eNodeBs 20, NAS signaling security, AS Security control, Inter CN node signaling for mobility between 3GPP access networks, Idle mode UE Reachability (including control and execution of paging retransmission), Tracking Area list management (for UE in idle and active mode), PDN GW and Serving GW selection, MME selection for handovers with MME change, SGSN selection for handovers to 2G or 3G 3GPP access networks, Roaming, Authentication, Bearer management functions including dedicated bearer establishment, Support for PWS (which includes ETWS and CMAS) message transmission. The SAE gateway host provides assorted functions including Per-user based packet filtering (by e.g. deep packet inspection), Lawful Interception, UE IP address allocation, Transport level packet marking in the downlink, UL and DL service level charging, gating and rate enforcement, DL rate enforcement based on APN-AMBR. For clarity MME/SAE gateway 30 will be referred to herein simply as a "gateway," but it is understood that this entity includes both an MME and an SAE gateway.

A plurality of nodes may be connected between eNodeB 20 and gateway 30 via the S1 interface. The eNodeBs 20 may be connected to each other via an X2 interface and neighboring eNodeBs may have a meshed network structure that has the X2 interface.

As illustrated, eNodeB 20 may perform functions of selection for gateway 30, routing toward the gateway during a Radio Resource Control (RRC) activation, scheduling and transmitting of paging messages, scheduling and transmitting of Broadcast Channel (BCCH) information, dynamic allocation of resources to UEs 10 in both uplink and downlink, configuration and provisioning of eNodeB measurements, radio bearer control, radio admission control (RAC), and connection mobility control in LTE_ACTIVE state. In the EPC, and as noted above, gateway 30 may perform functions of paging origination, LTE-IDLE state management, ciphering of the user plane, System Architecture Evolution (SAE) bearer control, and ciphering and integrity protection of Non-Access Stratum (NAS) signaling.

The EPC includes a mobility management entity (MME), a serving-gateway (S-GW), and a packet data network-gateway (PDN-GW). The MME has information about connections and capabilities of UEs, mainly for use in managing the mobility of the UEs. The S-GW is a gateway having the E-UTRAN as an end point, and the PDN-GW is a gateway having a packet data network (PDN) as an end point.

FIG. 3 is a diagram showing a control plane and a user plane of a radio interface protocol between a UE and an E-UTRAN based on a 3GPP radio access network standard. The control plane refers to a path used for transmitting control messages used for managing a call between the UE and the E-UTRAN. The user plane refers to a path used for transmitting data generated in an application layer, e.g., voice data or Internet packet data.

A physical (PHY) layer of a first layer provides an information transfer service to a higher layer using a physical channel. The PHY layer is connected to a medium access control (MAC) layer located on the higher layer via a transport channel. Data is transported between the MAC layer and the PHY layer via the transport channel. Data is transported between a physical layer of a transmitting side and a physical layer of a receiving side via physical channels. The physical channels use time and frequency as radio resources. In detail, the physical channel is modulated using an orthogonal frequency division multiple access (OFDMA) scheme in downlink and is modulated using a single carrier frequency division multiple access (SC-FDMA) scheme in uplink.

The MAC layer of a second layer provides a service to a radio link control (RLC) layer of a higher layer via a logical channel. The RLC layer of the second layer supports reliable data transmission. A function of the RLC layer may be implemented by a functional block of the MAC layer. A packet data convergence protocol (PDCP) layer of the second layer performs a header compression function to reduce unnecessary control information for efficient transmission of an Internet protocol (IP) packet such as an IP version 4 (IPv4) packet or an IP version 6 (IPv6) packet in a radio interface having a relatively small bandwidth.

A radio resource control (RRC) layer located at the bottom of a third layer is defined only in the control plane. The RRC layer controls logical channels, transport channels, and physical channels in relation to configuration, re-configuration, and release of radio bearers (RBs). An RB refers to a service that the second layer provides for data transmission between the UE and the E-UTRAN. To this end, the RRC layer of the UE and the RRC layer of the E-UTRAN exchange RRC messages with each other.

One cell of the eNB is set to operate in one of bandwidths such as 1.25, 2.5, 5, 10, 15, and 20 MHz and provides a downlink or uplink transmission service to a plurality of UEs in the bandwidth. Different cells may be set to provide different bandwidths.

Downlink transport channels for transmission of data from the E-UTRAN to the UE include a broadcast channel (BCH) for transmission of system information, a paging channel (PCH) for transmission of paging messages, and a downlink shared channel (SCH) for transmission of user traffic or control messages. Traffic or control messages of a downlink multicast or broadcast service may be transmitted through the downlink SCH and may also be transmitted through a separate downlink multicast channel (MCH).

Uplink transport channels for transmission of data from the UE to the E-UTRAN include a random access channel (RACH) for transmission of initial control messages and an uplink SCH for transmission of user traffic or control messages. Logical channels that are defined above the transport channels and mapped to the transport channels include a broadcast control channel (BCCH), a paging control channel (PCCH), a common control channel (CCCH), a multicast control channel (MCCH), and a multicast traffic channel (MTCH).

FIG. 4 is a view showing an example of a physical channel structure used in an E-UMTS system. A physical channel includes several subframes on a time axis and several subcarriers on a frequency axis. Here, one subframe includes a plurality of symbols on the time axis. One subframe includes a plurality of resource blocks and one resource block includes a plurality of symbols and a plurality of subcarriers. In addition, each subframe may use certain subcarriers of certain symbols (e.g., a first symbol) of a subframe for a physical downlink control channel (PDCCH), that is, an L1/L2 control channel. In FIG. 4, an L1/L2 control information transmission area (PDCCH) and a data area (PDSCH) are shown. In one embodiment, a radio frame of 10 ms is used and one radio frame includes 10 subframes. In addition, one subframe includes two consecutive slots. The length of one slot may be 0.5 ms. In addition, one subframe includes a plurality of OFDM symbols and a portion (e.g., a first symbol) of the plurality of OFDM symbols may be used for transmitting the L1/L2 control information. A transmission time interval (TTI) which is a unit time for transmitting data is 1 ms.

A base station and a UE mostly transmit/receive data via a PDSCH, which is a physical channel, using a DL-SCH which is a transmission channel, except a certain control signal or certain service data. Information indicating to which UE (one or a plurality of UEs) PDSCH data is transmitted and how the UE receive and decode PDSCH data is transmitted in a state of being included in the PDCCH.

For example, in one embodiment, a certain PDCCH is CRC-masked with a radio network temporary identity (RNTI) "A" and information about data is transmitted using a radio resource "B" (e.g., a frequency location) and transmission format information "C" (e.g., a transmission block size, modulation, coding information or the like) via a certain subframe. Then, one or more UEs located in a cell monitor the PDCCH using its RNTI information. And, a specific UE with RNTI "A" reads the PDCCH and then receive the PDSCH indicated by B and C in the PDCCH information.

FIG. 5 is a block diagram of a communication apparatus according to an embodiment of the present invention.

The apparatus shown in FIG. 5 can be a user equipment (UE) and/or eNB adapted to perform the above mechanism, but it can be any apparatus for performing the same operation.

As shown in FIG. 5, the apparatus may comprises a DSP/microprocessor (110) and RF module (transmiceiver; 135). The DSP/microprocessor (110) is electrically connected with the transciver (135) and controls it. The apparatus may further include power management module (105), battery (155), display (115), keypad (120), SIM card (125), memory device (130), speaker (145) and input device (150), based on its implementation and designer's choice.

Specifically, FIG. 5 may represent a UE comprising a receiver (135) configured to receive a request message from a network, and a transmitter (135) configured to transmit the transmission or reception timing information to the network. These receiver and the transmitter can constitute the transceiver (135). The UE further comprises a processor (110) connected to the transceiver (135: receiver and transmitter).

Also, FIG. 5 may represent a network apparatus comprising a transmitter (135) configured to transmit a request message to a UE and a receiver (135) configured to receive the transmission or reception timing information from the UE. These transmitter and receiver may constitute the transceiver (135). The network further comprises a processor (110) connected to the transmitter and the receiver. This processor (110) may be configured to calculate latency based on the transmission or reception timing information.

FIG. 6 is a diagram for MAC structure overview in a UE side.

The MAC layer handles logical-channel multiplexing, hybrid-ARQ retransmissions, and uplink and downlink scheduling. It is also responsible for multiplexing/demultiplexing data across multiple component carriers when carrier aggregation is used.

The MAC provides services to the RLC in the form of logical channels. A logical channel is defined by the type of information it carries and is generally classified as a control channel, used for transmission of control and configuration information necessary for operating an LTE system, or as a traffic channel, used for the user data.

In order to transmit on the UL-SCH the MAC entity must have a valid uplink grant (except for non-adaptive HARQ retransmissions) which it may receive dynamically on the PDCCH or in a Random Access Response or which may be configured semi-persistently. To perform requested transmissions, the MAC layer receives HARQ information from lower layers. When the physical layer is configured for uplink spatial multiplexing, the MAC layer can receive up to two grants (one per HARQ process) for the same TTI from lower layers.

If the MAC entity has a C-RNTI, a Semi-Persistent Scheduling C-RNTI, or a Temporary C-RNTI, the MAC entity shall for each TTI and for each Serving Cell belonging to a TAG that has a running timeAlignmentTimer and for each grant received for this TTI, the MAC entity may consider the NDI to have been toggled for the corresponding HARQ process regardless of the value of the NDI, and deliver the uplink grant and the associated HARQ information to the HARQ entity for this TTI if: i) an uplink grant for this TTI and this Serving Cell has been received on the PDCCH for the MAC entity's C-RNTI or Temporary C-RNTI; or ii) an uplink grant for this TTI has been received in a Random Access Response, and if the uplink grant is for MAC entity's C-RNTI and if the previous uplink grant delivered to the HARQ entity for the same HARQ process was either an uplink grant received for the MAC entity's Semi-Persistent Scheduling C-RNTI or a configured uplink grant.

Else, if this Serving Cell is the SpCell and if an uplink grant for this TTI has been received for the SpCell on the PDCCH of the SpCell for the MAC entity's Semi-Persistent Scheduling C-RNTI, the MAC entity may consider the NDI for the corresponding HARQ process not to have been toggled, and deliver the uplink grant and the associated HARQ information to the HARQ entity for this TTI, if the NDI in the received HARQ information is 1. Else if the NDI in the received HARQ information is 0, the MAC entity may clear the configured uplink grant if PDCCH contents indicate SPS release. Or, the MAC entity may store the uplink grant and the associated HARQ information as configured uplink grant, initialise (if not active) or re-initialise (if already active) the configured uplink grant to start in this TTI and to recur, consider the NDI bit for the corresponding HARQ process to have been toggled, and deliver the configured uplink grant and the associated HARQ information to the HARQ entity for this TTI, if PDCCH contents do not indicate SPS release.

Else, if this Serving Cell is the SpCell and an uplink grant for this TTI has been configured for the SpCell, the MAC entity may consider the NDI bit for the corresponding HARQ process to have been toggled, and deliver the configured uplink grant, and the associated HARQ information to the HARQ entity for this TTI.

The period of configured uplink grants is expressed in TTIs. If the MAC entity receives both a grant in a Random Access Response and a grant for its C-RNTI or Semi persistent scheduling C-RNTI requiring transmissions on the SpCell in the same UL subframe, the MAC entity may choose to continue with either the grant for its RA-RNTI or the grant for its C-RNTI or Semi persistent scheduling C-RNTI. When a configured uplink grant is indicated during a measurement gap and indicates an UL-SCH transmission during a measurement gap, the MAC entity processes the grant but does not transmit on UL-SCH.

Meanwhile, there is one HARQ entity at the MAC entity for each Serving Cell with configured uplink, which maintains a number of parallel HARQ processes allowing transmissions to take place continuously while waiting for the HARQ feedback on the successful or unsuccessful reception of previous transmissions.

When the physical layer is configured for uplink spatial multiplexing, there are two HARQ processes associated with a given TTI. Otherwise there is one HARQ process associated with a given TTI.

At a given TTI, if an uplink grant is indicated for the TTI, the HARQ entity identifies the HARQ process(es) for which a transmission should take place. It also routes the received HARQ feedback (ACK/NACK information), MCS and resource, relayed by the physical layer, to the appropriate HARQ process(es).

When TTI bundling is configured, the parameter TTI_BUNDLE_SIZE provides the number of TTIs of a TTI bundle. TTI bundling operation relies on the HARQ entity for invoking the same HARQ process for each transmission that is part of the same bundle. Within a bundle HARQ retransmissions are non-adaptive and triggered without waiting for feedback from previous transmissions according to TTI_BUNDLE_SIZE. The HARQ feedback of a bundle is only received for the last TTI of the bundle (i.e the TTI corresponding to TTI_BUNDLE_SIZE), regardless of whether a transmission in that TTI takes place or not (e.g. when a measurement gap occurs). A retransmission of a TTI bundle is also a TTI bundle. TTI bundling is not supported when the MAC entity is configured with one or more SCells with configured uplink.

TTI bundling is not supported for RN communication with the E-UTRAN in combination with an RN subframe configuration. For transmission of Msg3 during Random Access, TTI bundling does not apply.

For each TTI, the HARQ entity shall identify the HARQ process(es) associated with this TTI and for each identified HARQ process.

If an uplink grant has been indicated for this process and this TTI, the HARQ entity shall obtain the MAC PDU to transmit from the "Multiplexing and assembly" entity, deliver the MAC PDU and the uplink grant and the HARQ information to the identified HARQ process, and instruct the identified HARQ process to trigger a new transmission if: i) the received grant was not addressed to a Temporary C-RNTI on PDCCH and if the NDI provided in the associated HARQ information has been toggled compared to the value in the previous transmission of this HARQ process; or ii) the uplink grant was received on PDCCH for the C-RNTI and the HARQ buffer of the identified process is empty; or iii) there is no MAC PDU in the Msg3 buffer and the uplink grant was received in a Random Access Response. If there is a MAC PDU in the Msg3 buffer and the uplink grant was received in a Random Access Response, the HARQ entity shall obtain the MAC PDU to transmit from the Msg3 buffer. Else, the MAC entity shall deliver the uplink grant and the HARQ information (redundancy version) to the identified HARQ process, and instruct the identified HARQ process to generate an adaptive retransmission.

Else, if the HARQ buffer of this HARQ process is not empty, the HARQ entity shall instruct the identified HARQ process to generate a non-adaptive retransmission.

When determining if NDI has been toggled compared to the value in the previous transmission the MAC entity shall ignore NDI received in all uplink grants on PDCCH for its Temporary C-RNTI.

Each HARQ process is associated with a HARQ buffer.

Each HARQ process shall maintain a state variable CURRENT_TX_NB, which indicates the number of transmissions that have taken place for the MAC PDU currently in the buffer, and a state variable HARQ_FEEDBACK, which indicates the HARQ feedback for the MAC PDU currently in the buffer. When the HARQ process is established, CURRENT_TX_NB shall be initialized to 0.

The sequence of redundancy versions is 0, 2, 3, 1. The variable CURRENT_IRV is an index into the sequence of redundancy versions. This variable is up-dated modulo 4.

New transmissions are performed on the resource and with the MCS indicated on PDCCH or Random Access Response. Adaptive retransmissions are performed on the resource and, if provided, with the MCS indicated on PDCCH. Non-adaptive retransmission is performed on the same resource and with the same MCS as was used for the last made transmission attempt.

The MAC entity is configured with a Maximum number of HARQ transmissions and a Maximum number of Msg3 HARQ transmissions by RRC: maxHARQ-Tx and maxHARQ-Msg3Tx respectively. For transmissions on all HARQ processes and all logical channels except for transmission of a MAC PDU stored in the Msg3 buffer, the maximum number of transmissions shall be set to maxHARQ-Tx. For transmission of a MAC PDU stored in the Msg3 buffer, the maximum number of transmissions shall be set to maxHARQ-Msg3Tx.

When the HARQ feedback is received for this TB, the HARQ process shall set HARQ_FEEDBACK to the received value.

If the HARQ entity requests a new transmission, the HARQ process shall: i) set CURRENT_TX_NB to 0; ii) set CURRENT_IRV to 0; iii) store the MAC PDU in the associated HARQ buffer; iv) store the uplink grant received from the HARQ entity; v) set HARQ_FEEDBACK to NACK; and vi) generate a transmission as described below.

If the HARQ entity requests a retransmission, the HARQ process shall: i) increment CURRENT_TX_NB by 1; ii) store the uplink grant received from the HARQ entity, set CURRENT_IRV to the index corresponding to the redundancy version value provided in the HARQ information, set HARQ_FEEDBACK to NACK, generate a transmission as described below, if the HARQ entity requests an adaptive retransmission; iii) generate a transmission as described below else if the HARQ entity requests a non-adaptive retransmission and if HARQ_FEEDBACK=NACK.

It is noted that i) When receiving a HARQ ACK alone, the MAC entity keeps the data in the HARQ buffer; and ii) When no UL-SCH transmission can be made due to the occurrence of a measurement gap, no HARQ feedback can be received and a non-adaptive retransmission follows.

To generate a transmission, if the MAC PDU was obtained from the Msg3 buffer or if there is no measurement gap at the time of the transmission and, in case of retransmission, the retransmission does not collide with a transmission for a MAC PDU obtained from the Msg3 buffer in this TTI, the HARQ process shall instruct the physical layer to generate a transmission according to the stored uplink grant with the redundancy version corresponding to the CURRENT_IRV value and increment CURRENT_IRV by 1. If there is a measurement gap at the time of the HARQ feedback reception for this transmission and if the MAC PDU was not obtained from the Msg3 buffer, the HARQ process shall set HARQ_FEEDBACK to ACK at the time of the HARQ feedback reception for this transmission.

After performing above actions, the HARQ process then shall flush the HARQ buffer if CURRENT_TX_NB= maximum number of transmissions–1.

Meanwhile, the HARQ operation described above discards erroneously received packets and requests retransmission. However, despite it not being possible to decode the packet, the received signal still contains information, which is lost by discarding erroneously received packets. This shortcoming is addressed by HARQ with soft combining. In HARQ with soft combining, the erroneously received packet is stored in a buffer memory and later combined with the retransmission to obtain a single, combined packet that is more reliable than its constituents. Decoding of the error-correction code operates on the combined signal. If the decoding fails (typically a CRC code is used to detect this event), a retransmission is requested.

Retransmission in any HARQ scheme must, by definition, represent the same set of information bits as the original transmission. However, the set of coded bits transmitted in each retransmission may be selected differently as long as they represent the same set of information bits. HARQ with soft combining is therefore usually categorized into Chase combining and incremental redundancy, depending on whether the retransmitted bits are required to be identical to the original transmission or not.

Shifting the focus to the uplink, a difference compared to the downlink case is the use of synchronous, non-adaptive operation as the basic principle of the HARQ protocol, motivated by the lower overhead compared to an asynchronous, adaptive structure. Hence, uplink retransmissions always occur at an a priori known subframe; in the case of FDD operation uplink retransmissions occur eight subframes after the prior transmission attempt for the same HARQ process. The set of resource blocks used for the retransmission on a component carrier is identical to the initial transmission. Thus, the only control signaling required in the downlink for a retransmission is a HARQ acknowledgement transmitted on the PHICH. In the case of a negative acknowledgement on the PHICH, the data is retransmitted.

Despite the fact that the basic mode of operation for the uplink is synchronous, non-adaptive HARQ, there is also the possibility to operate the uplink HARQ in a synchronous, adaptive manner, where the resource-block set and modulation-and-coding scheme for the retransmissions is changed. Although non-adaptive retransmissions are typically used due to the very low overhead in terms of downlink control signaling, adaptive retransmissions are sometimes useful to avoid fragmenting the uplink frequency resource or to avoid collisions with random-access resources. This is shown in FIG. 7.

FIG. 7 shows an example of Non-adaptive and adaptive HARQ operation.

Referring to FIG. 7, a terminal is scheduled for an initial transmission in subframe n. A transmission that is not correctly received and consequently a retransmission is required in subframe n+8 (assuming FDD) (for TDD, the timing obviously depends on the downlink-uplink allocation). With non-adaptive HARQ, the retransmissions occupy the same part of the uplink spectrum as the initial transmission. Hence, in this example the spectrum is fragmented, which limits the bandwidth available to another terminal (unless the other terminal is capable of multi-cluster transmission). In subframe n+16, an example of an adaptive retransmission is found; to make room for another terminal to be granted a large part of the uplink spectrum, the retransmission is moved in the frequency domain. It should be noted that the uplink HARQ protocol is still synchronous. That is, a retransmission should always occur eight subframes after the previous transmission.

The support for both adaptive and non-adaptive HARQ is realized by not flushing the transmission buffer when receiving a positive HARQ acknowledgement on PHICH for a given HARQ process. Instead, the actual control of whether data should be retransmitted or not is done by the new-data indicator (NDI) included in the uplink scheduling grant sent on the PDCCH. The NDI is toggled for each new transport block. If the NDI is toggled, the terminal flushes the transmission buffer and transmits a new data packet. However, if the NDI does not request transmission of a new transport block, the previous transport block is retransmitted. Hence, clearing of the transmission buffer is not handled by the PHICH but by the PDCCH as part of the uplink grant. The negative HARQ acknowledgement on the PHICH could instead be seen as a single-bit scheduling grant for retransmissions where the set of bits to transmit and all the resource information are known from the previous transmission attempt. An example of postponing a transmission is seen in subframe n+24 in FIG. 7. The terminal has received a positive acknowledgement and therefore does not retransmit the data. However, the transmission buffer is not flushed, which later is exploited by an uplink grant requesting retransmission in subframe n+32.

A consequence of the above method of supporting both adaptive and non-adaptive HARQ is that the PHICH and PDCCH related to the same uplink subframe have the same timing. If this were not the case, the complexity would increase as the terminal would not know whether to obey the PHICH or wait for a PDCCH overriding the PHICH. As explained earlier, the NDI is explicitly transmitted in the uplink grant. However, unlike the downlink case, the redundancy version is not explicitly signaled for each retransmission. With a single-bit acknowledgement on the PHICH, this is not possible. Instead, as the uplink HARQ protocol is synchronous, the redundancy version follows a predefined pattern, starting with zero when the initial transmission is scheduled by the PDCCH. Whenever a retransmission is requested by a negative acknowledgement on the PHICH, the next redundancy version in the sequence is used. However, if a retransmission is explicitly scheduled by the PDCCH overriding the PHICH, there is the potential to affect the redundancy version to use.

In FIG. 7, the initial transmission in subframe n uses the first redundancy version in sequence as the transport-block size must be indicated for the initial transmission. The retransmission in subframe n+8 uses the next redundancy version in the sequence, while the explicitly scheduled retransmission in subframe n+16 can use any redundancy scheme as indicated on the PDCCH.

In the legacy UL HARQ operation described above, adaptive retransmission is performed based on the UL grant, HARQ buffer status, and NDI value. More specifically, if UL grant with C-RNTI is received and if NDI is not toggled and if HARQ buffer is not empty, adaptive retransmission is performed. Or if UL grant with SPS C-RNTI is received and NDI=1, adaptive retransmission is performed.

In Rel-13, in scope of Latency Reduction, it is allowed for the UE to skip UL grant if there is no data available for transmission. In legacy operation, the UE sends a MAC PDU containing a MAC CE for padding BSR and optionally padding bits in response to an allocated UL dynamic or configured grant even if no data is available for transmission in the UE buffer and no other regular MAC CE is needed to be sent. With frequent UL grants, allowing skipping UL grants may decrease UL interference and improve UE battery efficiency. Thus, it is allowed for UE to skip (most) dynamic and configured uplink grants if no data is available for transmission (The UE will continue to send one or more regular MAC CE(s), if any. That is, here, the data refers the data in a PDCP entity and a RLC entity but excluding e.g., MAC Control Elements other than Padding BSR.). The eNB may enable skipping UL grants by RRC dedicated signalling.

Meanwhile, if a UE skips an UL transmission as discussed above, and if the eNB still follows the legacy HARQ operation, the eNB may transmit UL grant for adaptive retransmission by assuming that the eNB fails at receiving the data even though the UE skips UL transmission. More specific examples regarding the problems will be discussed with reference to FIGS. 8A and 8B.

FIGS. 8A and 8B show exemplary problems in case that a UE skips UL transmission.

Referring to FIG. 8A, the UE skips UL transmission in case of a dynamic UL grant. After the UE skips new transmission with empty HARQ buffer and receives adaptive retransmission, the UE will consider it as UL grant for new transmission even though the eNB intended adaptive retransmission. In this case, if new data becomes available for transmission, the UE will transmit the data as a new transmission. However, there would be difference in Redundancy Version (RV) between the eNB and the UE due to synchronous HARQ operation (e.g., RV=0 in the UE but RV=2 in the eNB, as shown in FIG. 8A). Accordingly, the eNB may not be able to successfully decode the received data.

Referring to FIG. 8B, the UE skips UL transmission in case of a SPS UL grant. After the UE skips new transmission with empty HARQ buffer and receives adaptive retransmission, the UE will consider it as UL grant for adaptive retransmission. In this case, if new data becomes available for transmission, the UE will follow adaptive retransmission procedure as per MAC specification even though there is no MAC PDU in the HARQ buffer. Accordingly, the UE can perform neither a new transmission nor an adaptive retransmission.

As shown in FIGS. 8A and 8B, adaptive retransmission is not working well in case the UE skips UL transmission. Intention of adaptive retransmission is to adapt the transmission characteristics and resources depending on the channel status and scheduling situation. Given that the UE will be allowed to skip UL transmission when channel status is good or cell load is not very high, it seems not so necessary to use adaptive retransmission. Therefore, a new method is required to handle UL grant for adaptive retransmission.

Thus, it is invented that if a UE receives an UL grant for adaptive retransmission while the UE is configured to skip UL transmission in case there is no data available for transmission, the UE discards (or ignores) the received UL grant for adaptive retransmission and does not perform UL transmission, even if there is data available for transmission. More specific descriptions will be introduced with reference to FIGS. 9, 10A and 10B.

FIG. 9 is a diagram for handling an adaptive retransmission in a wireless communication system according to embodiments of the present invention.

In descriptions with reference to FIG. 9, it is assumed that a UE is configured by an eNB that the UE skips UL transmission if there is no data available for transmission via RRC signaling. The UE can be configured to skip UL transmission for a certain time period.

If the UE is configured to skip UL transmission in case there is no data available for transmission, and if the UE has received an UL grant and the UL grant is for a TTI within the certain time period, the UE checks whether it is for adaptive retransmission or new transmission. The checking may be performed according to above descriptions in FIG. 6.

As a result of the checking, if it is for adaptive retransmission (i.e., a new data indicator (NDI) of the HARQ process is same as the last one), the UE considers the UL grant as an invalid UL grant, and the UE discards (or ignores) the received UL grant. That is, the UE acts as if the UE hasn't received the UL grant. Else, as a result of the checking, if it is for new transmission (i.e. the NDI of the HARQ process is different from the last one), the UE considers the UL grant as a valid UL grant, and constructs a MAC PDU and transmits it to the eNB using the received UL grant if there is data available for transmission. Else, if there is no data available for transmission, the UE skips UL transmission. That is, the UE discards the received UL grant.

In the present invention, the UE considers the UL grant for adaptive retransmission as an invalid UL grant regardless of whether there is data available for transmission or not. The UE considers the UL grant for adaptive retransmission as an invalid UL grant even if the HARQ buffer of the HARQ process for which the invalid UL grant is indicated is not empty.

When the UE considers the UL grant for adaptive retransmission as an invalid UL grant, the UE may transmits to the eNB an Invalid UL grant Reception Notification via RRC/MAC/PHY signaling. The Invalid UL grant Reception Notification may include: i) UE identification, or ii) HARQ process ID for which the invalid UL grant is indicated, or iii) Cell index of the HARQ process for which the invalid UL grant is indicated.

Referring to FIG. 9, the UE receives a radio resource control (RRC) signaling configuring that the UE skips an UL transmission if there is no data available for transmission (S901). According to the RRC signaling, for a certain time period, the UE may skip UL transmission if there is no data available for transmission.

The UE receives an UL grant for retransmission for a hybrid automatic repeat and request (HARQ) process when a HARQ buffer of the HARQ process is empty (S903). The UL grant for retransmission may include a value of a new data indicator (NDI) of the HARQ process, which is same as a previous value of the NDI of the HARQ process. The UL grant for retransmission may be received after the UE skips an UL grant for new-transmission for the HARQ process, because the UL grant is for retransmission although the HARQ buffer of the HARQ process is empty.

After receiving UL grant for retransmission, new data may become available for transmission. However, in the present invention, the UE discards the UL grant for the retransmission even if there is data available for transmission (S905). That is, the UE doesn't perform any UL transmission using the UL grant for retransmission even if there is data available for transmission. It may be because that the UL grant is for retransmission, but the data available for transmission is new data.

Meanwhile, although it is not shown in FIG. 9, the UE may further transmits to an eNB a notification indicating that the UE discards the received UL grant. Preferably, the notification includes an UE identification or a HARQ process identifier (ID) for which the discarded UL grant is indicated, or a cell index of the HARQ process for which the discarded UL grant is indicated.

FIGS. 10A and 10B show examples of UE operation for handling an adaptive retransmission according to embodiments of the present invention.

Referring to FIG. 10A, after receiving a dynamic UL grant, the UE skips UL transmission if a corresponding HARQ buffer is empty. After the UE skips new UL transmission with empty HARQ buffer and receives an UL grant for adaptive retransmission (i.e., receives an UL grant with same NDI in case the UL grant is received via a PDCCH addressed to a C-RNTI), the UE will consider it as UL grant for new transmission even though the eNB intended adaptive retransmission. In this case, even if new data becomes available for transmission, the UE discards the UL grant for adaptive retransmission.

Referring to FIG. 10B, after receiving a SPS UL grant, the UE skips UL transmission if a corresponding HARQ buffer is empty. After the UE skips new transmission with empty HARQ buffer and receives an UL grant for adaptive retransmission (i.e., receives an UL grant with NDI=1 in case the UL grant is received via a PDCCH addressed to a SPS C-RNTI), the UE will consider it as UL grant for adaptive retransmission. In this case, even if new data becomes available for transmission, the UE discards the UL grant for adaptive retransmission.

In summary, according to the present invention, adaptive retransmission can work well in case that the UE skips an UL transmission.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by subsequent amendment after the application is filed.

In the embodiments of the present invention, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'eNB' may be replaced with the term 'fixed station', 'Node B', 'Base Station (BS)', 'access point', etc.

The above-described embodiments may be implemented by various means, for example, by hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

Those skilled in the art will appreciate that the present invention may be carried out in other specific ways than those set forth herein without departing from essential characteristics of the present invention. The above embodiments are therefore to be construed in all aspects as illustrative and not restrictive. The scope of the invention should be determined by the appended claims, not by the above description, and all changes coming within the meaning of the appended claims are intended to be embraced therein.

INDUSTRIAL APPLICABILITY

While the above-described method has been described centering on an example applied to the 3GPP LTE system, the present invention is applicable to a variety of wireless communication systems in addition to the 3GPP LTE system.

The invention claimed is:

1. A method for wireless communication, the method comprising:
    receiving a first uplink grant for a hybrid automatic repeat and request (HARQ) process;
    determining whether the first uplink grant for the HARQ process is a dynamic uplink grant with a first radio network temporary identifier (RNTI) or a semi-persistent scheduling (SPS) uplink grant with a second RNTI;
    determining whether the first uplink grant for the HARQ process is for retransmission or new transmission;
    based on the determining that the first uplink grant is for the retransmission, and based on the determining that the first uplink grant is the SPS uplink grant with the second RNTI, and based on a HARQ buffer of the HARQ process being empty, ignoring the received first uplink grant with the second RNTI related to the SPS uplink grant; and
    based on the determining that the first uplink grant is for the retransmission and based on the determining that the first uplink grant is the dynamic uplink grant with the first RNTI, not performing an uplink transmission by ignoring the first uplink grant with the first RNTI.

2. The method of claim 1,
    skipping the uplink transmission when there is no data available for transmission.

3. The method of claim 1, wherein the receiving occurs at a user equipment (UE) and the ignoring occurs at the UE.

4. The method of claim 1,
    wherein the first uplink grant is received via a physical downlink control channel (PDCCH) or radio resource control (RRC) signaling.

5. An apparatus for wireless communication, the apparatus comprising:
    a memory;
    a transceiver; and
    a processor operatively coupled to the memory and the transceiver, wherein the processor is configured to:
    receive a first uplink grant for a hybrid automatic repeat and request (HARQ) process;
    determine whether the first uplink grant for the HARQ process is a dynamic uplink grant with a first radio network temporary identifier (RNTI) or a semi-persistent scheduling (SPS) uplink grant with a second RNTI;
    determine whether the first uplink grant for the HARQ process is for retransmission or new transmission;
    based on the determine that the first uplink grant is for the retransmission, and based on the determine that the first uplink grant is the SPS uplink grant with the second RNTI, and based on a HARQ buffer of the HARQ process being empty, ignore the received first uplink grant with the second RNTI related to the SPS uplink grant; and
    based on the determine that the first uplink grant is for the retransmission and based on the determine that the first uplink grant is the dynamic uplink grant with the first RNTI, not perform an uplink transmission by ignoring the first uplink grant with the first RNTI.

6. The apparatus of claim 5, wherein the processor is further configured to skip the uplink transmission when there is no data available for transmission.

7. The apparatus of claim 5, wherein the apparatus is a user equipment (UE).

8. The apparatus of claim 5, wherein the first uplink grant is received via a physical downlink control channel (PDCCH) or radio resource control (RRC) signaling.

9. The apparatus of claim 5, wherein the memory comprises the HARQ buffer.

* * * * *